000
United States Patent [19]

Pennewiss et al.

[11] Patent Number: 4,665,121

[45] Date of Patent: May 12, 1987

[54] CONCENTRATED EMULSIONS OF OLEFIN COPOLYMERS

[75] Inventors: Horst Pennewiss, Darmstadt-Neu-Kranichstein; Roland Schweder, Darmstadt-Kranichstein; Helmut Knoell, Lautertal, all of Fed. Rep. of Germany

[73] Assignee: Röhm GmbH, Darmstadt, Fed. Rep. of Germany

[21] Appl. No.: 887,521

[22] Filed: Jul. 21, 1986

Related U.S. Application Data

[60] Division of Ser. No. 718,185, Mar. 29, 1985, Pat. No. 4,622,358, which is a continuation of Ser. No. 468,185, Feb. 22, 1983, abandoned.

[30] Foreign Application Priority Data

Mar. 1, 1982 [DE] Fed. Rep. of Germany ....... 3207292

[51] Int. Cl.$^4$ .............................................. C08J 3/02
[52] U.S. Cl. .................................... 524/457; 526/201
[58] Field of Search ........................ 524/457; 526/201

[56] References Cited

U.S. PATENT DOCUMENTS

| | | | |
|---|---|---|---|
| 4,098,980 | 4/1978 | Markle et al. | 526/201 |
| 4,282,132 | 8/1981 | Benda et al. | 524/504 |
| 4,290,925 | 9/1981 | Pennewiss et al. | 585/3 |

Primary Examiner—Joseph L. Schofer
Assistant Examiner—J. M. Reddick
Attorney, Agent, or Firm—Curtis, Morris & Safford

[57] ABSTRACT

What are disclosed are concentrated emulsions of an olefin copolymer in a liquid carrier medium which does not dissolve the copolymer and, as an emulsifier, a graft or block copolymer of the formula $$A-Y,$$

wherein A represents a sequence or segment of an olefin copolymer, of hydrogenated polyisoprene, or of an hydrogenated butadiene/isoprene copolymer, and Y represents a sequence or segment, formed by the polymerization of vinyl monomers which essentially are not of the acrylate or methacrylate type, which is soluble in the carrier medium, as well as methods for making the same.

4 Claims, No Drawings

CONCENTRATED EMULSIONS OF OLEFIN COPOLYMERS

This application is a division of application Ser. No. 718,185 filed Mar. 29, 1985, now U.S. Pat. No. 4,622,358, which in turn is a continuation of application Ser. No. 468,185 filed Feb. 22, 1983 and now abandoned.

The present invention relates to concentrated emulsions of olefin copolymers in a carrier medium which does not dissolve olefin copolymers, which emulsions are suitable for use as lubricating oil additives, particularly together with acrylic resins, and to methods for making the same.

Two classes of polymers, namely, oil soluble olefin copolymers (OCP), and in particular ethylene propylene copolymers, and oil soluble polymers comprising polyalkyl acrylates and methacrylates (PAMA), are widely used as lubricating oil additives since they improve the viscosity/temperature behavior of multigrade mineral oils. Apart from their thickening action, such viscosity index improvers must have adequate shear stability. Viscosity index improvers are further expected to have good dispersing or detergent action toward cold sludge and dirt which deposits in engines. Both product classes have advantages and disadvantages. Polyolefins have excellent thickening action but no appreciable pour point depressant effect so that pour point improvers must be added. Polyalkyl methacrylate additives impart to mineral oils a good viscosity/temperature behaviour and, when sufficiently concentrated, excellent wear protection. They are also noted for their pour point depressant effect.

What militates against combining the two types of polymers for simultaneous use in minerals oils is their incompatibility. Industry demands lubricating oil additives in liquid form (comprising a mineral oil) which have as high a polymer content as possible. However, the two polymer types together are soluble in mineral oil without difficulty only when one polymer type definitely predominates in terms of quantity, i.e. the other polymer type should not amount to more than 5 weight percent, based on the total polymer content. If this limit is exceeded, phase separation will occur in the polymers, which can result in the formation of layers during extended storage.

Published German patent application 29 05 954 discloses concentrated polymer emulsions of polyacrylates or methacrylates (PAMA) and olefin copolymers (OCP) in mineral oil which are suitable for viscosity index improvement. The emulsions contain polyacrylates or polymethacrylates with a defined low molecular weight range as the continuous phase, an OCP with a molecular weight that is complementary with respect to thickening action as the disperse phase, a carrier medium which is a good solvent for PAMA and (because of the PAMA dissolved therein) a far less efficient solvent for OCP, as well as a graft and/or block polymer of olefin copolymers and acrylate and/or methacrylate esters as a stabilizing agent for the phase distribution. The highest OCP-to-PAMA ratio obtainable in accordance with said German patent application (claim 4) is 60:40. The carrier medium may further contain solvents having less solvent power for OCP, for example an ester or alcohol.

A major reason for the poor solubility is the incompatibility of the OCP phase with the PAMA phase: since the mineral oil contained in the carrier medium dissolves both phases about equally well, an approximately even distribution between the two phases results.

The teachings of published German patent application 29 05 954 represent a solution tailored to the system OCP/PAMA in mineral oil, which solution requires a number of parameters to be observed. Generally the OCP, present in solid form, is first dissolved in mineral oil. The emulsifier, usually prepared in situ and consisting of a graft and/or block polymer of OCP and acrylate or methacrylate ester, is then added. The amount of emulsifier, required to stabilize the phases, should not be less than 5 weight percent, based on the total polymer. On the other hand, too high a percentage of graft polymer as stabilizer/emulsifier tends to reduce the effectiveness of viscosity index improvers.

Thus, there has been a need for providing emulsions of olefin copolymers which have far broader uses than those of the prior art. With regard to the emulsifiers, too, a greater degree of flexibility than that available with prior art systems was sought, together with a reduction in the amount of emulsifier required. Being able to prepare a concentrated emulsion of the OCP directly, that is to say without an intermediate dissolving step, would offer advantages.

The OCP to be emulsified is part of the prior art. Structurally it usually is an olefin copolymer, hydrogenated polyisoprene, or an hydrogenated butadiene/isoprene copolymer, all of a type discussed further below with respect to component A of emulsifier AY. The molecular weights generally range from 10,000 to 300,000.

A feature of the present invention is a concentrated emulsion of an OCP in a carrier medium suitable for use as an oil additive. In particular, the emulsion comprises a graft copolymer or block copolymer of the formula $$A-Y,$$

where A is a sequence or segment of an OCP, of hydrogenated polyisoprene, or of an hydrogenated butadiene/isoprene copolymer, and Y represents at least one segment of at least one polymer of vinyl monomers essentially other than acrylates and methacrylates. Group Y is soluble in the carrier medium.

The concentrated OCP emulsions of the invention generally contain from 20 to 65 weight percent, and preferably from 30 to 50 weight percent, of OCP. One requirement which is dispensed with is that the carrier medium be a poor solvent for the OCP phase by reason of the polyacrylate or methacrylate esters dissolved therein. Rather, poor solubility is now due to the chemical and physical properties of polymer and solvent.

The emulsifiers effective in accordance with the invention correspond to the general formula $$A-Y,$$

wherein A is a sequence or segment of an olefin copolymer, of hydrogenated polyisoprene, or of an hydrogenated butadiene/isoprene copolymer, and Y is one or more segments formed by the polymerization of vinyl monomers which essentially, that is to say to the extent of over 70 percent, are not of the acrylate or methacrylate type.

The olefin copolymers corresponding to A which are to be used in accordance with the invention are known per se. They are primarily composed of ethylene, propylene, butylene, and/or other alpha-olefins having from 5 to 20 carbon atoms. Their molecular weight generally ranges from 10,000 to 300,000, and preferably from 50,000 to 150,000. Such olefin copolymers are described in published German patent applications DOS 16 44 941, 17 69 834, 19 39 037, 19 63 039, and 20 59 981, for example. When A is a segment of a hydrogenated polyisoprene, commercially available block copolymers comprising a selectively hydrogenated polyisoprene/polystyrene (such as the commercial product "SHELLVIS 50") are preferred.

Ethylene/propylene copolymers are particularly suitable for use. Terpolymers incorporating known ter components such as ethylidene-norbornene [see Macromolecular Reviews, 10 (1975)] may also be used, but their tendency to crosslink upon aging must be taken into account. The distribution may be largely statistical. However, sequence polymers with ethylene blocks may also be used, and to advantage. The ratio between the monomers ethylene and propylene is variable within certain limits, the upper limit being about 75% for ethylene and about 80% for propylene. Because of its reduced solubility in oil, even polypropylene is less well suited than are ethylene/propylene copolymers.

Segment Y is preferably formed of vinyl homopolymers or copolymers, composed of styrene, alpha-methylstyrene, vinyltoluene or of monomers of the formula

wherein $R_1$ represents hydrogen or methyl, Z is $-OR_2$, $-COR_3$,

or chlorine, and wherein $R_2$ is phenyl or linear or branched alkyl having from 1 to 20 carbon atoms, $R_3$ is phenyl or linear or branched alkyl having from 1 to 20 carbon atoms, and n is 0 or 1.

Segment Y may further contain monomers of the formula

wherein $R_4$ and $R_5$ each represent hydrogen or $-COOR'_7$, $R_6$ represents hydrogen or $-CH_2COOR''_7$, a condition being that the compound of formula (III) contain two ester groups, and wherein $R_7$, $R'_7$, and $R''_7$ each represent linear or branched alkyl having from 1 to 20 carbon atoms.

Segment Y optionally may further contain amounts of monomers of the formula

wherein $R_1'$ has the meaning of $R_1$ and $B_s$ represents a nitrogen-containing functional group such as $-C\equiv N$ or $-CONR_8R_9$, wherein $R_8$ and $R_9$, taken alone, represent hydrogen or alkyl having from 1 to 20 carbon atoms, or wherein $R_8$ and $R_9$, taken together with the nitrogen atom to which they are bound, form a five- or six-membered heterocyclic ring, or wherein $B_s$ represents an inert heterocyclic group, and in particular a pyridine, pyrolidine, imidazole, carbazole, or lactam group, or alkylated derivatives thereof, or $B_s$ has the meaning $-CH_2OH$.

The polymer Y may further contain optional amounts of monomers of the formula

wherein X represents unsubstituted or alkyl-substituted alkylene having from 2 to 8 carbon atoms and $R_{11}$ represents $-OH$, $-OR_7'$ or $-NR_8'R_9'$, $R_8'$ and $R_9'$ having the same meanings as $R_8$ and $R_9$ when taken alone, or, taken together, forming a five- or six-membered heterocyclic ring together with the nitrogen atom, optionally with inclusion of a further hetero atom, and $R_{10}$ represents hydrogen or methyl.

Examples of monomers of formulas (II) and (III) are, in particular, vinyl chloride, vinyl acetate, vinyl stearate, vinyl methyl ketone, vinyl isobutyl ether, allyl acetate, allyl chloride, allyl isobutyl ether, allyl methyl ketone, dibutyl maleate, dilauryl maleate, and dibutyl itaconate.

The proportion of monomers of the formulas (IV) and (V) in segment Y generally ranges from 0 to 60 weight percent, based on the monomers of segment Y. The proportion of the monomers derived from acrylic or methacrylic acid should be less than 30 weight percent.

In a particular case, segment Y will be selected, with respect to its amount and composition, with due regard to the desired technical function of the system. Thus, segment Y, like segment A, will have to meet specific requirements to be optimally suited for use as viscosity index improver for mineral oils. The stability of the emulsion will be particularly good if the molecular weight of the OCP to be emulsified and if the molecular weight of segment Y is greater than 20,000.

In the present case, a requirement is that segment Y, too, be adequately soluble in mineral oils. The proportion of polar monomers, and particularly of monomers of the formulas (IV) and (V), in this case will not exceed 20 weight percent and preferably ranges from 0 to 10 weight percent, and still more preferably from 0 to 5 weight percent, based on the monomers of segment Y. Monomers of formula (IV) are C- and N-vinylpyridine as well as vinylpyrrolidine, vinylpyrrolidine, vinylcarbazole, and vinylimidazole, for example, and particularly the N-vinyl compounds. Monomers of formula (V) are, in particular, the hydroxyalkyl and dialkylaminoalkyl esters of acrylic acid and of methacrylic acid, and especially dimethylaminoethyl acrylate and methacrylate, dimethylaminopropyl acrylate and methacrylate, and hydroxyethyl acrylate and methacrylate.

The amount of monomers of the formulas (II) and (III) may be as high as 100 weight percent and preferably ranges from 100 to 50 weight percent.

The weight ratio of segments A and Y generally ranges from 1:20 to 20:1 and preferably ranges from 1:4 to 1:1.

In general, the concentrated OCP emulsions in accordance with the invention contain the emulsifier AY in concentrations ranging from 1 to 50 weight percent, and preferably from 5 to 15 weight percent. When the concentrated emulsions of the invention are intended for end uses other than as viscosity index improvers, segment Y can be appropriately adapted to the intended use. In addition, according to the invention the OCP emulsions may contain a known stabilizer against degradation, e.g. a sterically hindered amine.

As a rule, the emulsifier is prepared in advance in a separate step. The methods of preparing suitable emulsifiers of the type A-Y are known per se. Thus, the method used may be transfer grafting, for example. [See also Houben-Weyl, "Methoden der Org. Chemie", vol. 14/1, page 114; H. A. J. Battaerd and G. W. Tregear, Polymer Reviews, vol. 16, Interscience (1967)].

For this purpose, a 10 to 20% solution of an OCP is prepared in a suitable solvent which is inert under polymerization conditions. Advantageously a solvent system is used such that the emulsifier dissolved therein can be readily added to the carrier medium in the present process. This means that the boiling point will have to be above the process temperature. Suitable solvents are butyl acetate, trimethyladipate octyl ester, pentaerythritol tetraadipate ester, and the like. The vinyl monomers of formulas (II) to (V) are added to these solutions in the ratios indicated and polymerized with the addition of one or more preferably peroxidic free radical initiators at temperatures between 60° and 150° C., usually within from 4 to 8 hours. As nearly complete conversion as possible is desirable. Per esters such as tert-butyl peroctoate are preferably used. The initiator concentration depends on the number of desired grafting sites and on the desired molecular weight of segment Y. The initiator concentration generally ranges from 0.2 to 3 weight percent, based on the polymer.

Optionally, chain transfer agents may be used for adjustment of the desired molecular weight of the Y segments. Suitable agents are organosulfur compounds, for example, and in particular agents containing mercapto groups, for example dodecyl mercaptan. The concentration of chain transfer agent generally ranges from 0.1 to 1.0 weight percent, based on the total polymer.

A further method of preparing the emulsifier AY involves the hydroperoxidation of an OCP as a first step. The hydroperoxide groups so formed in the chain can then initiate the graft polymerization of the vinyl monomers in a succeeding step. (See H. A. J. Battaerd and G. W. Tregear, Polymer Reviews, loc. cit.)

One method of preparing suitable block polymers is anionic polymerization. Isoprene or butadiene, for example, is polymerized with an appropriate anionic initiator (an organometallic compound, for example) and the "living" anionic chain ends are reacted with styrene, for example. The polymers so produced are then hydrogenated under conditions under which the functional groups present are not attacked. For details of preparation, reference is made to the pertinent literature, for example, Houben-Weyl, "Methoden der Org. Chemie", 14/1, pp. 110 et seq.; "Block Copolymers", D. C. Allport and W. H. Janes, Appl. Sci. Publishers Ltd., London, 1973; "Graft Copolymers", H. A. J. Battaerd and G. W. Tregear, in Polymer Reviews, vol. 16 (1967); "Block and Graft Polymers", W. J. Burlant and A. S. Hoffman, Reinhold Publishing Corp., New York, 1960.

The liquid carrier medium used is, by definition, one which causes the olefin copolymers to swell to a degree of from 5 to 300 weight percent, the so called degree of swelling, in the 40° C. to 150° C. temperature range. The degree of swelling is determined as follows: An OCP film 1 mm thick, 2 cm long, and 0.5 cm wide and of known weight is immersed in the carrier at a specified temperature, which in this case is 90° C. (temperature of incorporation) and is so maintained for 24 hours at constant temperature. Then it is removed from the solution with tweezers, freed of adhering swelling agent with filter paper, and immediately weighed. The percentage increase in weight over the initial weight constitutes the measure of swelling. Swelling should be measured at the temperature at which the concentrated OCP emulsion is to be prepared. In accordance with the invention, the swelling at said temperature should be in the 5 to 300 percent range. A requirement for the applicability of this criterion is that maximum swelling of the OCP is obtained under the conditions indicated above.

The solvents which can be used as liquid carrier media in accordance with the invention should be inert and generally harmless. Carrier media which meet these requirements are esters, for example, and/or higher alcohols. As a rule, the compounds suitable for use as carrier medium contain more than 8 carbon atoms per molecule.

The esters of phosphoric acid, of dicarboxylic acids, of monocarboxylic acids with diols or polyalkylene glycols, and of neopentyl polyols with monocarboxylic acids are particularly suitable. (See Ullmanns "Enzyklopaedie der Technischen Chemie", 3rd ed., vol. 15, pp. 287–292, Urban & Schwarzenberg, 1964). For example, the phthalate esters, and particularly phthalate esters with $C_4$–$C_8$ alcohols, and more particularly dibutyl phthalate and dioctyl phthalate, as well as the esters of straight chain dicarboxylic acids with branched chain primary alcohols, are suitable esters of dicarboxylic acids. The esters of sebacic, adipic, and azelaic acid, and particularly the 2-ethylhexyl and isooctyl-3,5,5-trimethyl esters as well the esters with $C_8$, $C_9$ and $C_{10}$ oxo alcohols, are especially suitable.

The esters of straight chain primary alcohols with branched dicarboxylic acids are of particular importance. An example is alkyl-substituted adipic acid, for example 2,3,4-trimethyladipic acid.

The alcohol component may advantageously be made up of the oxo alcohols mentioned above, for example. Among the esters of monocarboxylic acids with diols or polyalkylene glycols, the diesters formed with diethylene glycol, triethylene glycol, tetraethylene glycol to decamethylene glycol, and also with dipropylene glycol as the alcohol component, are particularly suitable. Of the monocarboxylic acids, propionic acid, butyric acid or isobutyric acid, and pelargonic acid, and especially dipropylene glycol dipelargonate, diethylene glycol dipropionate and diisobutyrate, as well as the corresponding esters of triethylene glycol and tetraethylene glycol di-2-ethyl-hexanoate ester, are particularly suitable for use.

Mixtures of the above solvents may also be used as a carrier medium. The carrier medium usually represents from 79 to 25 weight percent, and preferably less than 70 weight percent, and more particularly from 60 to 40 weight percent, of the concentrated polymer emulsion.

The concentrated emulsions of olefin copolymers in a carrier medium in accordance with the invention may be grafted with further monomers, for example those defined in connection with the preparation of the emulsifiers under the formulas (II), (III), (IV), and (V).

Particularly well suited for this purpose are, for example, styrene, alpha-methylstyrene, vinyl esters such as vinyl acetate, and esters of acrylic and/or methacrylic acid with $C_1$ to $C_{30}$ alcohols, the latter especially in view of viscosity index improvement as an end use. Grafting with the polar monomers of formulas (IV) and (V), and particularly with N-vinyl-pyrrolidone, N-vinylimidazole, N-vinylpyridine, N-vinylcarbazole, and 2-dimethylaminoethyl methacrylate is also of special importance in this connection. In addition to stability improvement, other desired properties such as pour point improving as well as dispersing and detergent action can thus be obtained. Moreover, the OCP dispersions can be mixed with the type of polymer which corresponds with the soluble emulsifier component (Y in AY), these polymers then passing into the continuous phase. The preferred use of the concentrated OCP emulsions of the invention is in the area of viscosity index improvers. However, they will find use also in other industrial fields. There have been no concentrated OCP dispersions having dispersing and pour point depressing action on the market up to now, but only dilute (not more than 15%) solutions of olefin copolymers in mineral oil.

The concentrated OCP emulsions of the invention will be of special interest if they have been grafted with the monomers of formulas (IV) and (V). In that form, they are oil additives having dispersing, detergent, and pour point depressing action which are superior to the additives of the prior art. By comparison with OCP graft polymers produced in solution, higher grafting yields can be obtained in accordance with the invention. By proceeding as in grafting in solution, the grafting step, for example, can be carried out without the expenditures which have been unavoidable up to now. (See Houben-Weyl, loc. cit.)

A better understanding of the present invention and of its many advantages will be had by referring to the following specific examples, given by way of illustration.

EXAMPLE 1

Emulsifier AY1: a hydrogenated isoprene/styrene block copolymer, for example the commercially available product "SHELLVIS 50".

Carrier medium: Dibutyl phthalate
OCP swelling: 20% at 90° C.

70.25 g of a 20 wt. % solution of emulsifier AY1 in dibutyl phthalate, 162.8 g of dibutyl phthalate, and 0.38 g of "Irganox 565" [=2,4-bis(N-octylthio)-6-(4-hydroxy-3,5-di-tert-butylanilino)-1,3,5-triazine, a sterically hindered amine added as a stabilizer against OCP degradation] were charged into a one-liter Witt jar provided with a three-stage heavy duty shear stirrer (diameter ratio stirrer:jar=0.7; two circuit breakers; stirrer speed, about 450 rpm). 314.45 g of granulated OCP (ethylene/propylene copolymer with 30% propylene, degraded thermally and oxidatively from a molecular weight of about 150,000 to about 70,000) were then added in portions, with stirring, at 110° C. under a nitrogen atmosphere. Dispersing time: 4 to 5 hours. This was followed by diluting to a polymer content of 52.6 wt. % with 77.36 g of dibutyl phthalate. A milky, turbid OCP emulsion was obtained Viscosity=3400 mPa.sec/100° C.; 1540 mPa.sec/60° C.

Particle size=1 to 5 microns (phase-contrast microscope).

Viscosity (2% solution in mineral oil with 5.3 $mm^2$/sec/100° C.)=10.82/100° C.; 71.3/40° C.

13.84 g of dimethylaminoethyl methacrylate, 12.47 g of dibutyl phthalate, and 0.692 g of tert-butyl peroctoate were added to 500 g of this emulsion in the same apparatus at 100° C. Grafting occurred within 4 hours. Three 0.34 g portions of tert-butyl peroctoate were then added at 1 hour intervals. A mixture of 4.94 g of methyl methacrylate, 93.81 g of the methacrylate ester of a $C_{12}$ to $C_{18}$ alcohol mixture, 125.5 g of dibutyl phthalate, and 2.768 of tert-butyl peroctoate were then added and polymerization was carried out, again at 100° C. Two 1.384 g portions of tert-butyl peroctoate were then added, at 1 hour intervals. Polymerization was completed after 8 hours. A turbid, viscous emulsion was obtained.

Polymer content=50 wt. %. Particle size=1 to 3 microns (phase-contrast microscope).

Viscosity (5 $s^{-1}$ shear gradient)=7700 $mm^2$/sec/100° C.;

7580 $mm^2$/sec/60° C.; 3340 $mm^2$/sec/40° C.

Data on 2.85% solution in mineral oil with 5.3 $mm^2$/sec/100° C.:

Viscosity=10.70 $mm^2$/sec/100° C.; 69.0 $mm^2$/sec/40° C.

$VI_B$=144 ($VI_B$=viscosity index measured according to DIN 150 2909).

SSI*=20

Pour point=−31° C.

*SSI=shear stability index=loss in thickening action, in percent, during shear stability test in conformity with DIN 51382.

| Asphaltene test with | | | | | |
|---|---|---|---|---|---|
| 0.025 | 0.005 | 0.075 | 0.1 | 0.125 | 0.15% addition |
| − | − | − | + | + | + |

This OCP emulsion can be blended with commercially available oil additives comprising polyethylmethacrylate, e.g. the materials sold under the trademark "Viskoplex".

EXAMPLE 2

Emulsifier AY2: Polyvinyl toluene/OCP graft polymer
Carrier medium: Ethylene glycol acetate
OCP swelling: 23% at 90° C.

Preparation of emulsifier AY2

84 g of OCP (ethylene/propylene copolymer with 50% propylene, degraded thermally and oxidatively from a molecular weight of about 150,000 to 70,000) were dissolved in 280 g of butyl acetate at 100° C. in a one-liter Witt jar with a three-stage heavy duty shear stirrer. 40.4 g of vinyltoluene and 1 g of tert-butyl peroctoate were added to this solution. A mixture of 296.5 g of vinyltoluene and 2.956 g of tert-butyl peroctoate was then metered in under a nitrogen atmosphere at 100° C. over a period of 3.5 hours. Two hours after the end of this feed, 0.841 g of tert-butyl peroctoate was added. Total polymerization time: 8 hours. A turbid, viscous solution with a polymer content of 60 wt. % was obtained.

Preparation of OCP emulsion 70 g of emulsifier AY2, 200 g of ethoxy glycol acetate, and 100 g of granulated OCP (ethylene/propylene copolymer with 30% propylene, molecular weight reduced thermally and oxidatively from about 150,000 to 70,000) were charged to the apparatus of Example 1 and dispersed at 110° C. under a nitrogen atmosphere. After 1 hour, an additional 200 g of OCP were added in portions. The total dispersing time was 4 to 5 hours. A 60% turbid emulsion was obtained.

Particle size = 3 to 4 microns

Viscosity (at 5 s$^{-1}$ shear gradient) = 6,250 mPa.sec/80° C.;

3,980 mPa.sec/60° C.; 2,140 mPa.sec/40° C.; 1,510 mPa.sec/25° C.

EXAMPLE 3

Emulsifier AY3: Polyvinyl acetate/OCP graft polymer

Carrier medium: Ethoxy glycol acetate

OCP swelling: 23% at 90° C.

Preparation of emulsifier AY3

The procedure and weights of ingredients were as for emulsifier AY2, but vinyl acetate was used in place of vinyl toluene. A viscous turbid solution was obtained.

Preparation of OCP emulsion 70 g of emulsifier AY3 and 200 g of ethoxy glycol acetate were charged into a one-liter Witt jar with a heavy duty shear stirrer. 321 g of granulated OCP (ethylene/propylene copolymer with 30% propylene, molecular weight reduced thermally and oxidatively from about 150,000 to 100,000) were then added in portions, with stirring (450 rpm), at 110° C. under a nitrogen atmosphere. Dispersing time: 4 to 5 hours. A 61.4 wt. % turbid emulsion was obtained.

Viscosity (at 5 s$^{-1}$ shear gradient) = 8,570 mPa.sec/60° C.; 2,970 mPa.sec/40° C.; 1,710 mPa.sec/25° C.

EXAMPLE 4

Emulsifier AY2: Polyvinyl toluene/OCP graft copolymer

Carrier medium: Ethyl acetate

OCP swelling: 32% at 75° C.

Preparation of OCP emulsion 100 g of emulsifier AY2 and 300 g of ethyl acetate were charged into a one-liter Witt jar with a heavy duty shear stirrer at 80° C. 400 g of granulated OCP (ethylene/propylene copolymer with 30% propylene, molecular weight reduced thermally and oxidatively from 150,000 to 100,000) were then added in portions with stirring (450 rpm). Dispersing time: 6 to 8 hours. A 57.5 wt. % turbid emulsion was obtained.

Particle size: 3 to 5 microns

Viscosity (at 5 s$^{-1}$ shear gradient): 3,300 mPa.sec/60° C.; 380 mPa.sec/40° C.; 170 mPa.sec/25° C.

What is claimed is:

1. A method for making a concentrated polymer emulsion consisting of 20 to 65 percent, by weight of the emulsion, of a polymer in a liquid carrier medium together with an emulsifier, which method comprises dissolving said emulsifier in said liquid carrier medium and then emulsifying said polymer therein with shearing forces, said polymer being selected from the group consisting of hydrogenated polyisoprene, hydrogenated butadiene/isoprene, and olefin copolymers formed between alpha-olefins having 2 to 20 carbon atoms, said emulsifier being a graft or block copolymer of the formula $$A-Y,$$

wherein A is a polymer segment selected from the group consisting of hydrogenated polyisoprene, hydrogenated butadiene/isoprene, and olefin copolymers formed between alpha-olefins having 2 to 20 carbon atoms, and Y is at least one polymer segment formed by the polymerization of certain vinyl monomers selected from the group consisting of (a) at least one monomer of the formula $$H_2C=C(R_1)(CH_2)_nZ,$$

wherein $R_1$ is hydrogen or methyl, n is 0 or 1, Z is $-OR_2$, $-COR_3$, $-OCOR_3$, or chlorine, and $R_2$ and $R_3$ are phenyl or alkyl having 1 to 20 carbon atoms, and (b) up to 60 percent, by weight of (a), of at least one monomer of the formula $$H_2C=C(R_1)B_s,$$

wherein $R_1$ is hydrogen or methyl and $B_s$ is $-CN$, $-CH_2OH$, pyridine, pyrrolidine, imidazole, carbazole, lactam, or $-CONR_8R_9$, where $R_8$ and $R_9$, taken alone, are hydrogen or alkyl having from 1 to 20 carbon atoms and $R_8$ and $R_9$, taken together with the nitrogen atom to which they are bound, form a five- or six-membered ring, said carrier medium being an ester or higher alcohol having more than 8 carbon atoms which dissolves polymer segment Y of said emulsifier, does not dissolve polymer segment A or said polymer, but which will swell polymer segment A and said polymer to a degree from 5 to 30 percent by weight at a temperature from 40° C. to 150° C., and then graft copolymerizing thereon at least one further monomer selected from the group consisting of compounds of the formula $$\begin{array}{c} H \\ \diagdown \\ \phantom{x}\\ / \\ H \end{array} C=C \begin{array}{c} R_1{'} \\ \diagdown \\ \phantom{x} \\ / \\ B_s \end{array},$$

and compounds of the formula $$\begin{array}{c} R_{10} \\ | \\ H_2C=C-COO-X-R_{11}, \end{array}$$

wherein $R_1{'}$ is hydrogen or methyl, $B_s$ is $-CH_2OH$, an inert nitrogen-containing heterocyclic group, $-C\equiv N$, or $-CONR_8R_9$, wherein $R_8$ and $R_9$, taken alone, are hydrogen or $C_1$-$C_{20}$ alkyl, or $R_8$ and $R_9$, taken together with the nitrogen atom to which they are bound, form a five- or six-membered heterocyclic ring, X is unsubstituted or alkyl-substituted $C_2$-$C_8$ alkylene, $R_{11}$ is $-OH$, $-OR_7{'}$, or $NR_8{'}R_9{'}$, wherein $R_8{'}$ and $R_9{'}$ taken alone or together have the same meaning as $R_8$ and $R_9$, and $R_{10}$ is hydrogen or methyl.

2. A method for making a concentrated polymer emulsion consisting of 20 to 65 percent, by weight of the emulsion, of a polymer in a liquid carrier medium together with an emulsifier, which method comprises dissolving said emulsifier in said liquid carrier medium and then emulsifying said polymer therein with shearing forces, said polymer being selected from the group consisting of hydrogenated polyisoprene, hydrogenated butadiene/isoprene, and olefin copolymers formed between alpha-olefins having 2 to 20 carbon atoms, said emulsifiers being a graft or block copolymer of the formula

A—Y, wherein A is a polymer segment selected from the group consisting of hydrogenated polyisoprene, hydrogenated butadiene/isoprene, and olefin copolymers formed between alpha-olefins having 2 to 20 carbon atoms, and Y is a polymer segment formed by the polymerization of styrene or vinyltoluene, said carrier medium being an ester or higher alcohol having more than 8 carbon atoms which dissolves polymer segment Y of said emulsifier, does not dissolve polymer segment A or said polymer, but which will swell polymer segment A and said polymer to a degree from 5 to 30 percent by weight at a temperature from 40° C. to 150° C., and the graft copolymerizing thereon at least one further monomer selected from the group consisting of compounds of the formula

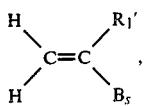

and compounds of the formula

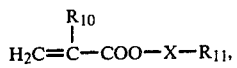

wherein $R_1'$ is hydrogen or methyl, $B_s$ is —CH$_2$OH, an inert nitrogen-containing heterocyclic group, —C≡N, or —CONR$_8$R$_9$, wherein $R_8$ and $R_9$, taken alone, are hydrogen or $C_1$–$C_{20}$ alkyl, or $R_8$ and $R_9$, taken together with the nitrogen atom to which they are bound, form a five- or six-membered heterocyclic ring, X is unsubstituted or alkyl-substituted $C_2$–$C_8$ alkylene, $R_{11}$ is —OH, —OR$_7'$, or —NR$_8'$R$_9'$, wherein $R_8'$ and $R_9'$ taken alone or taken together have the same meaning as $R_8$ and $R_9$, and $R_{10}$ is hydrogen or methyl.

3. A concentrated polymer emulsion made by the method of claim 1.

4. A concentrated polymer emulsion made by the method of claim 2.

* * * * *